United States Patent [19]
Nakamura et al.

[11] Patent Number: 5,277,984
[45] Date of Patent: Jan. 11, 1994

[54] MAGNETIC RECORDING MEDIUM COMPRISING FERROMAGNETIC POWDER, A SILANE COMPOUND, AND A BINDER COMPRISING AN EPOXY GROUP AND SPECIFIED FUNCTIONAL GROUP

[75] Inventors: Eitaro Nakamura; Katsuya Nakamura, both of Tokyo, Japan

[73] Assignee: Nippon Zeon Co., Ltd., Tokyo, Japan

[21] Appl. No.: 13,499

[22] Filed: Feb. 2, 1993

Related U.S. Application Data

[63] Continuation of Ser. No. 647,844, Jan. 30, 1991, abandoned.

[30] Foreign Application Priority Data

Feb. 2, 1990 [JP] Japan ................................ 2-23779

[51] Int. Cl.$^5$ ................................ G11B 5/00
[52] U.S. Cl. .................... 428/425.9; 252/62.54; 428/447; 428/480; 428/500; 428/521; 428/522; 428/523; 428/694 B; 428/900
[58] Field of Search .............. 428/694, 900, 425.9, 428/447, 402, 480, 500, 521, 522, 523; 252/62.54

[56] References Cited

U.S. PATENT DOCUMENTS

| | | | |
|---|---|---|---|
| 4,076,890 | 2/1978 | Yamada et al. | 428/337 |
| 4,271,234 | 6/1981 | Schönafinger et al. | 428/405 |
| 4,529,649 | 7/1985 | Takeuchi et al. | 428/328 |
| 4,594,174 | 6/1986 | Nakayama et al. | 252/62.54 |
| 4,707,410 | 11/1987 | Hata et al. | 428/413 |
| 4,707,411 | 11/1987 | Nakayama et al. | 428/413 |
| 4,731,292 | 3/1988 | Sasaki et al. | 428/425.9 |
| 4,851,465 | 7/1989 | Yamakawa et al. | 524/431 |
| 4,988,755 | 1/1991 | Dickens, Jr. et al. | 252/62.54 |

FOREIGN PATENT DOCUMENTS

| | | |
|---|---|---|
| 58-205929 | 12/1983 | Japan. |
| 1-49426 | 10/1989 | Japan. |
| 2-31319 | 2/1990 | Japan. |

*Primary Examiner*—Stevan A. Resan
*Attorney, Agent, or Firm*—Frishauf, Holtz, Goodman & Woodward

[57] ABSTRACT

A magnetic recording medium which comprises a magnetic layer is prepared by a dispersion of a powder of a ferromagnetic material in a binding material which is a macromolecular compound comprising an epoxy group, followed by addition to the dispersion of a silane compound comprising an amino group or a thiol group. A low viscosity magnetic coating material in which a fine powder of magnetic material is dispersed with excellent stability can thus be prepared. The recording medium prepared by using the coating material exhibits excellent magnetic characteristics, excellent durability and excellent running properties under variety of environmental conditions with desirable stability.

10 Claims, No Drawings

MAGNETIC RECORDING MEDIUM COMPRISING FERROMAGNETIC POWDER, A SILANE COMPOUND, AND A BINDER COMPRISING AN EPOXY GROUP AND SPECIFIED FUNCTIONAL GROUP

This application is a continuation of application Ser. No. 07/647,844, filed Jan. 30, 1991 now abandoned.

BACKGROUND OF THE INVENTION

1. Field of the Invention

The present invention relates to a novel magnetic coating material which is prepared by dispersing a fine powder of a ferromagnetic material in a binding material of a macromolecular compound comprising an epoxy group in it, followed by adding a silane compound comprising an amino group or a thiol group in it to the dispersion and to a novel magnetic recording medium which comprises a magnetic layer prepared from the magnetic coating material.

2. Prior Art

Higher recording density is an increasingly intensive requirement for magnetic recording media. In the case of recording tapes, for example, it is required that higher saturated magnetic flux density, higher rectangular ratio Rs which is obtained by dividing residual magnetic flux density Br by saturated magnetic flux density Bm, lower roughness of surface, excellent flexibility and excellent wear resistance are achieved simultaneously. When very fine powder of ferromagnetic materials having a specific surface area in the range from 30 $m^2/g$ to 70 $m^2/g$ is utilized because of the requirement for a higher S/N ratio and other properties as mentioned, binding materials utilized in the recording media are required to have both an excellent dispersing ability and a strong binding force simultaneously to disperse the very fine powder homogeneously and bind it tightly in the media.

Binding materials which are generally utilized for recording media are polyester resins; cellulosic resins; polyurethane resins; phenolic resins; epoxy resins; polyamide resins; polymers and copolymers of vinyl chloride, vinylidene chloride, vinyl acetate, (meth)acrylic esters, (meth)acrylamide, acrylonitrile, butadiene, styrene, vinyl esters and the like monomers; and the like materials used in combination with so called dispersing agents, such as low molecular weight surface active agents and fatty acids. However, among these generally utilized binding materials, no material satisfies the requirement that fine powder of magnetic materials must be dispersed homogeneously and, at the same time, the magnetic layer prepared must have excellent wear resistance.

Improvement of dispersion of powder of magnetic materials in binding materials has been a subject of study. It was reported that, when powder of a magnetic material is treated with aminosilane compounds, the dispersion is improved (Laid Open Japanese Patent Publication Showa 58-205929). It was also reported that, when a ternary copolymer of vinyl chloride, vinyl alcohol and vinyl acetate which is generally utilized as the binding material is modified with aminosilane compounds and used as the binding material, the dispersion is improved (Japanese Patent Publication Heisei 1-49426). However, the magnetic coating materials prepared according to these reports do not have good enough processability which is required for application of the coating material to the surface of base materials.

It is expected that an increase of the strength of the magnetic layer of a recording medium will enhance the durability of the recording medium. A binding material with increased strength is necessary for preparing the magnetic layer of increased strength. The binding material must be, at the same time, capable of forming a highly filled magnetic layer by homogeneously dispersing fine powder of magnetic materials. Increase of molecular weight of the binding material is effective for the increase of the strength of the binding material. However, the increase of molecular weight of the binding material causes an increase of viscosity of the coating material in which the powder of magnetic material is dispersed and the dispersing ability tends to become poorer. Furthermore, the finer the powder of the magnetic material, the more the viscosity of the coating material is increased. Because of the reason described here, methods to increase strength of binding material without increasing the molecular weight of the material are required. Crosslinking of the binding material by using polyisocyanate compounds is generally used as one of the methods. To crosslink the binding material by using polyisocyanate compounds, the binding material must comprise a structure which can react with the polyisocyanate compounds. It is generally practiced that groups having active hydrogen which can react with polyisocyanate compounds, such as the hydroxy group, are introduced into the binding material.

However, when a large amount of the hydroxy group is introduced into the binding material and the coating material contains lubricants and other like ingredients, such as fatty acids and fatty acid esters, stability of the dispersion of the powder of magnetic material is decreased and stable and reliable preparation becomes difficult. On the other hand, when the amount of the hydroxy group present in the binding material is less than the necessary amount, the degree of crosslinking is insufficient and the improvement of the strength can not be attained. Furthermore, the excess amount of isocyanate group of the polyisocyanate compound which exists more than adequate for the reaction with the hydroxy group reacts with moisture in the air and the magnetic layer formed becomes fragile. The method of crosslinking by using polyisocyanate compounds is not suitable for preparing reliable recording media with enough stability.

SUMMARY OF THE INVENTION

The present invention accordingly has an object to provide a coating material which comprise fine powder of a magnetic material dispersed with excellent stability and has low viscosity. Another object of the present invention is to provide a magnetic recording medium which exhibits excellent magnetic properties, durability and running properties with excellent stability in variety of environmental conditions.

Thus, the magnetic coating material of the present invention is prepared by dispersion of powder of a ferromagnetic material in a binding material which is a macromolecular compound comprising an epoxy group in it, followed by addition of a silane compound comprising an amino group or a thiol group in it to the dispersion. The magnetic recording medium of the invention comprises a magnetic layer prepared by dispersion of powder of a ferromagnetic material in a binding material which is a macromolecular compound comprising an epoxy group in it, followed by addition of a silane compound comprising an amino group or a thiol group in it to the dispersion.

Other and further objects, features and advantages of the invention will appear more fully from the following description.

DETAILED DESCRIPTION OF THE PREFERRED EMBODIMENTS

The present inventors studied extensively to solve the problems on the requirements of higher recording density and higher durability as described in the above and discovered that a magnetic coating material having low viscosity which comprises fine powder of a magnetic material dispersed with excellent stability can be prepared by employing specific resins and specific silane compounds for the binder of the magnetic material. The present inventors also discovered that the magnetic recording medium which is prepared by coating the magnetic coating material on the surface of nonmagnetic base material exhibits excellent magnetic properties, durability and running properties with excellent stability in variety of environmental conditions.

The magnetic coating material of the present invention is prepared by dispersion of powder of a ferromagnetic material in a binding material which is a macromolecular compound comprising an epoxy group in it, followed by addition of a silane compound comprising an amino group or a thiol group in it to the dispersion.

The magnetic recording medium of the invention comprises a magnetic layer prepared by dispersion of powder of a ferromagnetic material in a binding material which is a macromolecular compound comprising an epoxy group in it, followed by addition of a silane compound comprising an amino group or a thiol group in it to the dispersion.

The macromolecular compound comprising an epoxy group in it is preferably a polyvinyl chloride resin comprising epoxy group in it, a polyurethane resin comprising epoxy group in it, a polyester resin comprising epoxy group in it, a polybutadiene resin comprising epoxy group in it or a vinyl resin comprising epoxy group in it.

The macromolecular compound comprising epoxy group in it may additionally comprise a COOM group, a $SO_3M$ group, a $SO_4M$ group, a $PO(OM)_2$ group or an $N \oplus R_1R_2R_3 X \ominus$ group wherein M is an alkali metal or ammonium group, each of $R_1$, $R_2$ and $R_3$ is a hydrocarbon group and X is an anionic group.

The amino group or thiol group of the silane compound is combined with the macromolecular compound of the binding material through the reaction with the epoxy group in the macromolecular compound and, at the same time, the silanol part of the silane compound reacts with the surface of the powder of the magnetic material. In this way, a tight bonding is formed between the macromolecular compound and the powder of the magnetic material. The silane compound is also partially hydrolyzed and polymerized by the reaction with moisture in the atmosphere or in the magnetic layer to form siloxane linkage. By the effect of all these reactions combined, the strength of the binding material is increased, the friction of the magnetic layer is decreased and the running property of the recording medium is improved. In the case of the silane compound comprising a siloxane structure, though it does not react either with water or with the powder of the magnetic material, the powder of the magnetic material is combined with the binding material through the epoxy group comprised in the macromolecular compound of the binding material and the same kind of the improvement effect is exhibited.

Examples of the macromolecular compound comprising an epoxy group utilized in the invention are: polyvinyl chloride resins comprising an epoxy group, polyurethane resins comprising an epoxy group, polyester resins comprising an epoxy group and vinyl resins comprising an epoxy group. Other examples of the macromolecular compound comprising an epoxy group are polymers and copolymers of butadiene comprising an epoxy group, such as a copolymer of acrylonitrile and butadiene comprising an epoxy group, a copolymer of butadiene and styrene comprising an epoxy group, polybutadiene comprising an epoxy group and the like.

The polyvinyl chloride resins comprising an epoxy group utilized in the invention is prepared either by (1) copolymerization of vinyl chloride, a monomer which comprises an epoxy group in it and is radical copolymerizable with vinyl chloride and, according to the needs, other monomers copolymerizable with these monomers in the presence of a radical generator or by (2) epoxidation by an epoxidizing agent, such as a percarboxylic acid, of a resin which is prepared by partial dehydrochlorination of polyvinyl chloride resin or a copolymer resin comprising vinyl chloride as the main component by heating or by the use of dehydrochlorinating agent. Chlorinated polyvinyl chloride resin comprising an epoxy group is another example of the polyvinyl chloride resins comprising an epoxy group. The chlorinated polyvinyl chloride resin comprising an epoxy group can be prepared from chlorinated polyvinyl chloride resin or from chlorinated copolymer resin of vinyl chloride by the method (2) described above.

Examples of the monomer which comprises an epoxy group in it and is radical copolymerizable with vinyl chloride utilized in the preparation of polyvinyl chloride resins comprising an epoxy group are: glycidyl ethers of unsaturated alcohols, such as allyl glycidyl ether, methallyl glycidyl ether and the like; glycidyl esters of unsaturated acids, such as glycidyl acrylate, glycidyl methacrylate, glycidyl p-vinylbenzoate, methyl glycidyl itaconate, glycidyl ethyl maleate, glycidyl vinyl sulfonate, glycidyl vinyl (meth)allyl sulfonate and the like; and epoxyolefins, such as butadiene monooxide, vinylcyclohexene monooxide, 2-methyl-5,6-epoxyhexene and the like.

Examples of the other monomers copolymerizable with vinyl chloride and with a monomer which comprises an epoxy group in it and is radical copolymerizable with vinyl chloride are: vinyl esters of carboxylic acids, such as vinyl acetate, vinyl propionate and the like; vinyl ethers, such as methyl vinyl ether, isobutyl vinyl ether, cetyl vinyl ether and the like; vinylidene compounds, such as vinylidene chloride, vinylidene fluoride and the like; esters of unsaturated carboxylic acids, such as diethyl maleate, butyl benzyl maleate, di-2-hydroxyethyl maleate, dimethyl itaconate, methyl (meth)acrylate, ethyl (meth)acrylate, lauryl (meth)acrylate, 2-hydroxypropyl (meth)acrylate and the like; olefins, such as ethylene, propylene and the like; unsaturated nitriles, such as (meth)acrylonitrile and the like; and aromatic vinyl compounds, such as styrene, α-methylstyrene, p-methylstyrene and the like. These monomers can be properly selected according to needs, such as improvement of solubility of prepared resins by adjusting compatibility of the resins of the invention with other resins utilized with them and also by adjusting softening point of them, improvement of the characteristics of the coated layer, improvement of processability of coating and the like other needs.

The polyurethane resins comprising an epoxy group utilized in the invention have molecular weights in the range from 1,000 to 200,000. When the molecular weight is lower than 1,000, the durability of the coating layer is not sufficient. When the molecular weight is higher than 200,000, the viscosity of the coating material exceeds the desirable range and difficulties are found during the practice. The polyurethanes resin comprising an epoxy group can be prepared by, first, synthesizing a polyester resin having hydroxy groups at terminals of the molecule by the reaction of an epoxy resin having more than two epoxy groups in one molecule with a dibasic acid, such as adipic acid, phthalic acid, dimerized linolenic acid, maleic acid an the like, followed, next, by the reaction with a polyfunctional polyisocyanate. Examples of the epoxy resin having more than two epoxy groups in one molecule are: aromatic epoxy resins, such as bisphenol A type resins, halogenated bisphenol resins, resorcinol resins, bisphenol F type resins; aliphatic epoxy resins; alicyclic epoxy resins; and the like resins all comprising epoxy groups in said amount. Another method of preparation of the polyurethane resins comprising an epoxy group is, first, synthesis of an unsaturated polyurethane resin by using an unsaturated polyester resin as the material, which is, in turn, prepared by the reaction of unsaturated fatty acids, such as maleic acid, fumaric acid, itaconic acid and the like, with polyfunctional alcohols, followed, next, by the reaction with an epoxidizing agent, such as a percarboxylic acid. Still another method of preparation of the polyurethane resins comprising an epoxy group is reaction of polyester resins comprising an epoxy group with diisocyanates. The polyester resins comprising an epoxy group are described in detail in the following.

The polyester resins comprising an epoxy group utilized in the invention have molecular weights in the range from 1,000 to 200,000. When the molecular weight is lower than 1,000, the durability of the coating layer is not sufficient. When the molecular weight is higher than 200,000, the viscosity of the coating material exceeds the desirable range and difficulties are found during the practice. The polyurethane resins comprising an epoxy group can be prepared by epoxidation of an unsaturated polyester resin by means of an epoxidizing agent, such as a percarboxylic acid. The unsaturated polyester resin can be prepared by condensation by heating of either an unsaturated dibasic acid, such as maleic acid, fumaric acid, itaconic acid and the like, or a saturated acid, such as phthalic acid, adipic acid, terephthalic acid and the like, with an polyol, such as 1,4-butanediol, 1,5-pentanediol, 1,6-hexanediol, 1,10-decanediol, butadiene oligomers having hydroxy group at both ends of the molecule and the like. The unsaturated polyester resin used as the starting material may be replaced by a modified unsaturated polyester resin which is prepared by transesterification through melting and mixing of the unsaturated polyester resin with polycarbonate resin or saturated polyester resin in the presence of a catalyst.

The copolymers of acrylonitrile and butadiene comprising an epoxy group utilized in the invention have, in general, the content of acrylonitrile in the range from 12 to 50 weight percent and the molecular weight in the range from 5,000 to 500,000. When the content of acrylonitrile is lower than 12 weight percent, compatibility with other binding materials which are generally used in magnetic recording media, such as polyvinyl chloride, nitrocellulose and the like, is poor. When the content of acrylonitrile is higher than 50 weight percent, solubility in solvents is decreased and dispersion of powder of magnetic materials becomes poor to a large degree. When the molecular weight is lower than 5,000, the durability of the coating layer is not sufficient and, when the molecular weight is higher than 500,000, the viscosity of the coating material exceeds the desirable range and difficulties are found during the practice. The copolymers of acrylonitrile and butadiene comprising an epoxy group are prepared by copolymerization of acrylonitrile, butadiene, a radical polymerizable monomer containing an epoxy group and, according to needs, other copolymerizable monomers in the presence of a radical generator. Another method of preparation of the copolymers of acrylonitrile and butadiene comprising an epoxy group is partial epoxidation of double bonds in copolymers of acrylonitrile and butadiene by using a epoxidizing agent, such as a percarboxylic acid and the like.

The vinyl polymers comprising an epoxy group utilized in the invention are polymers or copolymers of one or more kinds of vinyl monomer comprising an epoxy group or copolymers of the vinyl monomer comprising an epoxy group with one or more kinds of other copolymerizable monomer. The monomers which comprises an epoxy group in it and is radical copolymerizable with vinyl chloride, utilized in the preparation of polyvinyl chloride resin comprising an epoxy group, can be utilized as the vinyl monomer comprising an epoxy group and also as the other copolymerizable monomer.

Examples of the vinyl polymers comprising an epoxy group are: copolymer resins of methyl methacrylate and glycidyl methacrylate, copolymer resins of methyl methacrylate, acrylic acid and glycidyl methacrylate, copolymer resins of styrene and glycidyl methacrylate and the like resins.

Concentration of the epoxy group in the resins comprising epoxy group utilized in the invention is in the range from 0.1 to 30 weight percent. When the concentration is lower than 0.1 weight percent, the reaction with the silane compound employed in the invention is not sufficient and the recording medium having sufficient durability can not be prepared.

For the purpose of further improvement of dispersion of powder of magnetic materials in the binding material, the resins comprising epoxy group preferably comprise additional functional groups, such as COOM, $SO_3M$, $SO_4M$, $PO(OM)_2$, $PO_4M_3$, $N^\oplus R_1R_2R_3X^\ominus$ and the like (wherein M is a hydrogen atom, an alkali metal or ammonium group, each of $R_1$, $R_2$, $R_3$ is an organic group, such as alkyl group, allyl group, alkenyl group or alkoxy group, and X is an anionic group). A group comprising active hydrogen atoms, such as hydroxy group and the like, may also be comprised in the resins. Preferable amount of the functional groups in the resins is in the range from $1\times10^{-6}$ to $1\times10^{-2}$ equivalent per gram.

Examples of the silane compound comprising amino group or thiol group utilized in the invention are:
N-(2-aminoethyl)-3-aminopropylmethyldimethoxysilane,
N-(2-aminoethyl)-3-aminopropyltrimethoxysilane, p-[N-(2-aminoethyl)aminomethyl]phenetyltrimethoxysilane,
1-(3-aminopropyl)-1,1,3,3,3-pentamethyldisiloxane,
3-aminopropyltriethoxysilane,
3-aminopropyl-tris(trimethylsiloxy)silane,
3-[N-allyl-N-(2-aminoethyl)]aminopropyltrimethoxysilane,
N-[3-(trimethoxysilyl)propyl]diethylenetriamine,
N-[3-(trimethoxysilyl)propyl]triethylenetetramine,
3-trimethoxysilylpropyl-m-phenylenediamine,
1,3-bis(3-aminopropyl)-1,1,3,3-tetramethyldisiloxane,
α,ω-bis(3-aminopropyl)polydimethylsiloxane,
N,N-bis[(methyldimethoxysilyl)propyl]amine,
N,N-bis[3-(methyldimethoxysilyl)propyl]ethylenediamine,
N,N-bis[3-(trimethoxysilyl)propyl]amine,
N,N-bis[3-(trimethoxysilyl)propyl]ethylenediamine,
hexamethyldisilazane,
α,ω-bis(3-mercaptopropyl)polydimethylsiloxane,
1,3-bis(3-mercaptopropyl)-1,1,3,3-tetramethyldisiloxane,
1,3-bis(mercaptomethyl)-1,1,3,3-tetramethyldisiloxane,
α,ω-bis(mercaptomethyl)polydimethylsiloxane,
3-mercaptopropyl-tris(trimethylsiloxy)silane,
3-mercaptopropyltrimethoxysilane,
1-(3-mercaptopropyl)-1,1,3,3,3-pentamethyldisiloxane,
1-mercaptomethyl-1,1,3,3,3-pentamethyldisiloxane
and the like compounds. The amount of the silane compound used in the coating material is in the range from 0.5 weight part to 10 weight parts per 100 weight parts of the powder of magnetic material.

In addition to the macromolecular compound comprising an epoxy group and the silane compound comprising an amino group or a thiol group both of which have been described, other materials which are generally utilized as binding materials may also be utilized in the recording medium of the invention. Examples of the other materials which are generally utilized as binding materials are: thermoplastic resins, such as polyurethane resins, polyvinyl chloride resins, polyester resins, copolymers of acrylonitrile and butadiene, copolymers of (meth)acrylic ester and acrylonitrile, copolymers of (meth)acrylic ester and vinylidene chloride, copolymers of (meth)acrylic ester and styrene, nylon-silicone resins, nitrocellulose-polyamide resins, polyvinyl fluorides, copolymers of vinylidene chloride and acrylonitrile, copolymers of styrene and butadiene, polyamide resins, polyvinyl butyral, derivatives of cellulose, such as cellulose acetate butyrate, cellulose acetate propionate, cellulose diacetate, cellulose triacetate, nitrocellulose and the like, copolymers of chlorovinyl ether and acrylic ester, various kinds of synthetic rubber and like other thermoplastic resins; and thermoset resins, such as phenolic resins, phenoxy resins, urea resins, melamine resins, alkyd resins, silicone resins, acrylic reactive resins, nitrocellulose-melamine resins and like other thermoset resins.

Polyisocyanate compounds which are generally used as a hardening agent can be used as the other materials which are generally utilized as binding materials. Examples of the polyisocyanate compounds are: an adduct of tolylene diisocyanate and trimethylolpropane, an adduct of hexamethylene diisocyanate and trimethylolpropane, trimer of tolylene diisocyanate, trimer of hexamethylene diisocyanate, magnetically hardenable polyurethane, urethane prepolymer having terminal isocyanate groups and other like compounds. Other examples of the polyisocyanate compounds are resins comprising urethane linkage formed by the reaction of diisocyanate and polyol, wherein the average number of isocyanate groups in a molecule is 2.3 or more, the number average molecular weight of the resin is in the range from 2,000 to 10,000 and the content of the component having a molecular weight less than 1,000 is less than 20 percent.

The amount of the resins used as the other materials which are generally utilized as binding materials may not exceed 50 percent of the total amount of the components of the binding material.

The binding material can comprise other known functional groups. The bonding material preferably comprises at least one of the functional groups selected from the group consisting of $-SO_4M$, $-SO_3M$, $-SO_2M$, $-COOM$, $-NH_2$, $-N^+R_3$, $-OH$, phosphoric acid group and phosphoric ester group wherein M is a hydrogen atom or an alkali metal, R is an organic group, such as an alkyl group, an alkenyl group, an alkoxy group and the like. The preferable amount of the functional group is in the range from $1 \times 10^{-6}$ to $1 \times 10^{-2}$ equivalent per 1 g of the resin.

The total amount of the binding material in the magnetic layer of the recording medium of the invention is in the range from 10 to 100 weight part per 100 weight parts of the powder of ferromagnetic material and preferably in the range from 14 to 40 weight part per 100 weight part of the powder of ferromagnetic material.

The recording medium of the invention can be prepared by the following procedures: mixing of the binding material, the powder of ferromagnetic material, lubricating agent, abrasives, antistatic agent and, if necessary, dispersing agent and other generally utilized materials with a solvent which contains ketones as the main component; preparation of a magnetic coating material by dispersion treatment of the mixture; coating of the coating material thus prepared on the surface of non-magnetic film such as a polyester film; orientation treatment; surface forming treatment; heat treatment for crosslinking and surface polishing, according to the requirement for application; cutting; and assembling to the final product.

Determination of the stage when the silane compound is added to the mixture during the mixing-dispersion process is particularly important to obtain good processability when the coating material is processed by a coating machine. Because the coating material having a smaller yielding value is desired for the purpose of attaining higher efficiency of coating process and, at the same time, ensuring the smoothness of the surface after coating, the silane compound must be added during the so-called letdown process in the later stage of the mixing process. When the silane compound is added to the mixture in the early stage or in the middle stage of the mixing process, coating materials having smaller $K_1$ value of Casson equation are obtained. However, because the yielding value of the coating materials can not be kept small in these conditions, a magnetic layer having a sufficiently smooth surface is not prepared and, thus, the object of the invention cannot be attained. When a polyisocyanate compound is used together with a silane compound in the binding material, simultaneous addition of the polyisocyanate compound and the silane compound must be avoided. When the recording medium of the invention is crosslinked during the preparation, conditioning with moisture, such as preliminary swelling of the magnetic layer with water and heat treatment in the atmosphere having 50% or more of relative humidity, is effective for enhancing stability about durability and running properties.

Examples of the ferromagnetic material utilized in the invention are: a powder of ferromagnetic oxides of iron, such as $\gamma\text{-Fe}_2\text{O}_3$, $\text{Fe}_3\text{O}_4$ and $\gamma\text{-FeO}_x$ ($1.33 < x < 1.5$), a powder of ferromagnetic oxides of iron doped with cobalt, a powder of ferromagnetic chromium dioxide, a powder of ferromagnetic metals, barium ferrite, a powder of iron carbide, such as $\text{Fe}_5\text{C}_2$ and a powder of iron nitride. Very fine powder is particularly preferable as the ferromagnetic material of the invention.

The a powder of ferromagnetic metals is powder of iron, cobalt, nickel and/or other ferromagnetic metals. An example of such a powder of ferromagnetic metals is powder of an alloy comprising 75 weight percent or more of the metal part, wherein 80 weight percent or more of the metal part is at least one of the ferromagnetic metals, such as Al, Fe, Co and Ni and/or ferromagnetic alloys, such as Fe-Co, Fe-Ni, Co-Ni and Co-Fe-Ni. Other components, such as Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P, may be contained in the range less than 20 weight percent of the metal part.

Methods of preparation of the powder of the ferromagnetic material is generally known and the powder of the ferromagnetic material utilized in the invention can be prepared according to such known methods.

The shape of the powder of ferromagnetic material is not particularly limited. Powders of needle shape, particulate shape, cubic shape, grain shape and plate shape are generally used.

The lubricating agents utilized in the invention are, for example, fatty acids, higher alcohols, amides and esters of fatty acids, all having carbon number in the range from 8 to 18. Examples of the lubricating agent are: caprylic acid, capric acid, lauric acid, myristic acid, palmitic acid, stearic acid, oleic acid, elaidic acid, linoleic acid, linolenic acid, stearolic acid, stearyl alcohol, palmityl alcohol, laurylamide, dimethylstearylamide, butyllaurylamide, butyl stearate, octyl stearate, sorbitan oleate and the like. Other examples of the lubricating agent are: silicone oils, fluorine containing oils, such as perfluoroalkylene oxide, perfluoroalkane and the like, paraffin wax, oxidized polyethylene and the like. Still other examples of the lubricating agent are solid lubricating agents, such as carbon black, graphite, molybdenum disulfide, tungsten disulfide and the like. The amount of the lubricating agent utilized is in the range from 1 weight part to 6 weight part per 100 weight part of powder of magnetic material.

The abrasives utilized in the invention are, for example, $\text{TiO}_2$, $\text{TiO}$, $\text{ZnO}$, $\text{CaO}$, $\text{SnO}_2$, $\text{SiO}_2$, $\alpha\text{-Fe}_2\text{O}_3$, $\text{Cr}_2\text{O}_3$, $\alpha\text{-Al}_2\text{O}_3$, $\text{ZnS}$, $\text{MoS}_2$, $\text{BaSO}_4$, $\text{CaSO}_4$, $\text{MgCO}_3$, BN, SiC and the like. These inorganic filling agents may be used singly or as a mixture of two more kinds.

Examples of the antistatic agents utilized in the invention are: conductive fine powders, such as carbon black, carbon black graft polymer and the like; natural surface active agents, such as saponine and the like; nonionic surface active agents, such as alkylene oxide surface active agents, glycerol surface active agents, glycidol surface active agents and the like; cationic surface active agents, such as higher alkyl amines, tertiary ammonium salts, salts of pyridine and other heterocyclic compounds, phosphonium compounds, sulfonium compounds and the like; anionic surface active agents, such as surface active agents comprising carboxylic acid group, sulfonic acid group, phosphoric acid group, sulfuric ester group, phosphoric ester group and the like in the molecule; amphoteric surface active agents, such as amino acids, aminosulfonic acids, sulfuric ester or phosphoric ester of aminoalcohols and the like agents.

Dispersing agents may be utilized in the recording medium of the invention according to the needs. Examples of the dispersing agents are: fatty acids having carbon number in the range from 10 to 22, such as caprilic acid, capric acid, lauric acid, myristic aid, palmitic acid, stearic acid, oleic acid, elaidic acid, linoleic acid, linolenic acid, stearolic acid and the like; metallic soaps prepared from the fatty acid and alkali metal, such as lithium, sodium and potassium, or alkaline earth metal, such as magnesium, calcium and barium; fluorine containing compounds in which part or all of hydrogen in the fatty acid ester or its derivatives are replaced with fluorine; amides of the fatty acids; aliphatic amines; higher alcohols; esters of alkylphosphoric acid and alkylene oxides; alkylphosphoric esters; alkylboric esters; sarcosinates, alkyl ether esters, trialkylpolyolefinoxy-tertiary ammonium salt; lecithin and other like generally known agents.

The invention will be understood more readily with reference to the following examples; however these examples are intended to illustrate the invention and are not to be construed to limit the scope of the invention. Numbers in parts or percent in the examples show parts by weight or percent by weight unless otherwise mentioned.

Example of the Macromolecular Compound Comprising an Epoxy Group 1

Allyl glycidyl ether, vinyl chloride and 2-hydroxypropyl methacrylate are copolymerized in emulsion by using persulfuric acid as the initiator. Vinyl chloride copolymer resin (a) thus prepared had 3.5% of epoxy group, 0.7% of sulfuric group, 0.7% of hydroxy group and 84% of vinyl chloride unit. The average molecular weight was 300.

Example of the Macromolecular Compound Comprising an Epoxy Group 2

Polyester resin was prepared by the reaction of bisphenol A type epoxy resin having epoxy equivalent of 182-194 and molecular weight of 355 with adipic acid. To the reaction product, 4,4'-diphenylmethane diisocyanate was added and the mixture was heated. Then, the following compound was added to the mixture for the reaction.

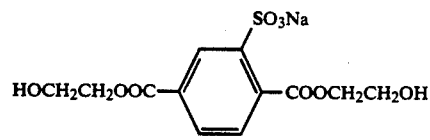

Polyurethane resin (b) comprising an epoxy group thus prepared had 10% of epoxy groups and had a molecular weight of about 17,000.

Magnetic coating materials and magnetic tapes were prepared by using these materials and evaluated as shown in the following examples. Results of the evaluation are shown in Table 1.

EXAMPLE 1

A mixture comprising 400 parts of powder of magnetic iron oxide coated with cobalt having a specific surface area of 32 m$^2$/g, 50 parts of the resin (a), 49 parts of methyl ethyl ketone, 49 parts of toluene, 32 parts of cyclohexanone, 3 parts of carbon black, 4 parts of alumina, 1 part of myristic acid and 0.5 part of butyl stearate were dispersed with high shear force for 90 minutes. To the mixture, 30 parts of the resin (b) and a mixed solvent comprising 30 parts of methyl ethyl ketone, 30 parts of toluene and 20 parts of cyclohexanone were added and dispersed for 30 minutes. Then, 50 parts of the mixed solvent having the same composition as the above and 15 parts of γ-aminopropyltriethoxysilane (TSL-8331, a product of Toshiba Silicone Co., Ltd) were added and dispersed for further 10 minutes and a magnetic coating material was prepared.

The magnetic coating material was applied on the surface of a polyester film to make a coating layer of 5 μm thickness. The coated film was treated with a magnetic orientation process and then dried. The gloss of the magnetic layer was measured by a glossmeter (MD-3 type, manufactured by Murakami Shikisai Giken Co., Ltd.).

The magnetic film used for the measurement of gloss was cut to a size of 6 mm × 6 mm and magnetic properties were measured by an instrument for measurement of magnetic properties (VSM-7P type, manufacture by Toei Kogyo Co., Ltd.).

The same magnetic film used for the measurement of gloss was treated with a smoothing process by using a calender roll, heat treated for 25 hours at 60° C. in the atmosphere of 60% relative humidity and placed under the load of 100 g at 40° C. in the atmosphere of 50% relative humidity so that the film makes contact with a rotating drum on the surface of which abrasive paper is placed. The drum was rotated for 10 minutes at 150 rpm and the amount of the magnetic coating material attached to the surface of the abrasive paper was observed by eyes. Durability of the magnetic film was evaluated by classifying the observed degree of stain of the abrasive paper due to the fragments of the coating material into the following three classes:

A: no stain, B: slight stain, C: heavy stain

The running properties were evaluated by measuring the force formed between the coated film and the rotating drum of the same apparatus as the above at 65° C. in the atmosphere of 80% relative humidity by using an U-gauge. The running resistance was evaluated by classifying into the following three classes:

A: low, B: medium, C: high

The results of the evaluation are listed in Table 1.

EXAMPLE 2

A coated film was prepared according to the same method as the method in Example 1 except that α,ω-bis(3-aminopropyl)polydimethylsiloxane (TSL-9386, a product of Toshiba Silicone Co., Ltd.) was used in place of γ-aminopropyltriethoxysilane. The coated film was evaluated by the same method as the method in Example 1. The results of the evaluation are listed in Table 1.

EXAMPLE 3

A coated film was prepared according to the same method as the method in Example 1 except that γ-mercaptopropyltrimethoxysilane (TSL-8380, a product of Toshiba Silicone Co., Ltd.) was used in place of γ-aminopropylethoxysilane. The coated film was evaluated in the same method as the method in Example 1. The results of the evaluation are listed in Table 1.

EXAMPLE 4

A coated film was prepared according to the same method as the method in Example 1 except that a polyurethane resin comprising 0.2% of hydroxy group but none of epoxy group which was prepared from polybutylene adipate, 4,4'-diphenylmethane diisocyanate, 1,4-butanediol and trimethylolpropane was used in place of the resin (b), that 10 parts of TSL-8331 was used in place of 15 parts of TSL-8331 and that, after addition of TSL-8331 to the mixture, 10 parts of an adduct of tolylene diisocyanate and trimethylolpropane (Coronate L ®, a product of Nippon Polyurethane Co., Ltd.) was added and then mixed for 5 minutes. The coated film was evaluated in the same method as the method in Example 1. The results of the evaluation are listed in Table 1.

COMPARATIVE EXAMPLE 1

A coated film was prepared according to the same method as the method in Example 1 except that Coronate L ® was used in place of γ-aminopropylethoxysilane. The coated film was evaluated in the same method as the method in Example 1. The results of the evaluation are listed in Table 1.

COMPARATIVE EXAMPLE 2

A coated film was prepared according to the same method as the method in Example 4 except that a copolymer of vinyl chloride, vinyl alcohol and vinyl acetate modified with γ-aminopropyltriethoxysilane was used in place of the resin (a) and that Coronate L ® was used in place of γ-aminopropyltriethoxysilane. The coated film was evaluated in the same method as the method in Example 1. The results of the evaluation is listed in Table 1.

The copolymer of vinyl chloride, vinyl alcohol and vinyl acetate modified with γ-aminopropyltriethoxysilane was prepared according to the method of Example 2 in Japanese Patent Publication Heisei 1-49426 and had the composition as following:

| | |
|---|---|
| Vinyl chloride unit | 88 |
| Vinyl alcohol unit | 7.6 |
| Vinyl acetate unit | 2.3 |
| Unit modified with aminosilane | 1.4 |
| Average degree of polymerization | 330 |

COMPARATIVE EXAMPLE 3

A coated film was prepared according to the same method as the method in Example 1 except that 15 parts of γ-aminopropyltriethoxysilane was used in place of 50 parts of the resin (a) and that 50 parts of a copolymer of vinyl chloride, vinyl alcohol and vinyl acetate (VAGH ® a product of Union Carbide Corporation) was used in place of 15 parts of γ-aminopropyltriethoxysilane. The coated film was evaluated in the same method as the method in Example 1. The results of the evaluation are listed in Table 1.

The results listed in Table 1 show that the powder of magnetic material is finely dispersed and the coating layer having excellent characteristics can be prepared when the coating layer is prepared according to the invention. The recording medium which is prepared by calendering, crosslinking, cutting and assembling of the coated film of the invention shows excellent durability and running properties.

COMPARATIVE EXAMPLE 4

A coated film was prepared according to the same method as the method in Example 1 except that, before dispersing the mixture with application of high shear force, γ-aminopropyltriethoxysilane, magnetic iron oxide, methyl ethyl ketone, toluene, cyclohexanone and myristic acid were preliminarily mixed for 4 hours without adding other components and the other components were then added to the preliminarily treated mixture. Of course, γ-aminopropyltriethoxysilane is not added at the time of letdown. When the coating material was prepared, the viscosity of the material was measured. The coated film thus prepared was tested by solvent extraction. The results are shown in in Table 2.

The yielding value of the coating material was measured by Brookfield viscometer BL type (a product of Tokyo Keiki Co., Ltd.) with the rotor #4. The values listed in Table 2 were obtained by the equation:

$$12 \times (V_6' - V_{12}')/100$$

where $V_6'$ and $V_{12}'$ are viscosities (cps) at the 6th rotation and the 12th rotation, respectively. An extract fraction of the coated layer was measured by the following method: a coated layer of weight W g was dipped in 100 g tetrahydrofuran for 24 hours and treated with an ultrasonic dispersing apparatus for 1 hour. A supernatant solution was separated by an ultracentrifuge. Solid component (t %) in the solution was measured by evaporation. The values listed in Table 2 were obtained by the equation:

$$\frac{(t \times 100)}{W \times (96.5/503.5)} \times 100$$

The results listed in Table 2 along with the results of the coating material of Example 1 clearly show that the coating layer prepared according to the invention had a lower yielding value and a smaller amount of material extracted by the solvent.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, a low viscosity magnetic coating material in which fine powder of magnetic material is dispersed with excellent stability can be prepared. The recording medium prepared by using the coating material exhibits excellent magnetic characteristics, excellent durability and excellent running properties under a variety of environmental conditions with sufficient stability.

TABLE 1

| | Example | | | | Comparative Example | | |
|---|---|---|---|---|---|---|---|
| | 1 | 2 | 3 | 4 | 1 | 2 | 3 |
| Gloss (%) | 108 | 101 | 108 | 101 | 101 | 34 | 89 |
| Magnetic properties | | | | | | | |
| Bm(Gauss) | 1620 | 1640 | 1640 | 1580 | 1610 | 1430 | 1490 |
| Br(Gauss) | 1380 | 1360 | 1400 | 1320 | 1290 | 1090 | 1180 |
| Rs | 0.85 | 0.83 | 0.85 | 0.84 | 0.80 | 0.76 | 0.79 |

TABLE 1-continued

| | Example | | | | Comparative Example | | |
|---|---|---|---|---|---|---|---|
| | 1 | 2 | 3 | 4 | 1 | 2 | 3 |
| Durability | A | A | A | A | B | C | B |
| Running property | A | A | A | A | C | C | C |

TABLE 2

| | Example 1 | Comparative example 4 |
|---|---|---|
| Yielding value of coating material (dyne/cm) | 163 | 520 |
| Extract fraction of coated layer (%) | 29 | 48 |

What is claimed is:

1. A magnetic recording medium which comprises a substrate on which is coated a magnetic layer prepared by dispersion of a powder of a ferromagnetic material in a binding material which is a macromolecular compound comprising an epoxy group, followed by addition to the dispersion of a silane compound comprising an amino group or a thiol group, wherein said macromolecular compound is selected from the group consisting of one or more of a polyvinyl chloride resin comprising an epoxy group, a polyurethane resin comprising an epoxy group, a polyester resin comprising an epoxy group, a polybutadiene resin comprising an epoxy group, a vinyl resin comprising an epoxy group, a copolymer of acrylonitrile and butadiene comprising an epoxy group and a copolymer of butadiene and styrene comprising an epoxy group, wherein the epoxy group in said macromolecular compound is present in a concentration of 3.5 to 10 weight percent; said macromolecular compound further comprising a functional group selected from the group consisting of a COOM group, a $SO_3M$ group, a $SO_4M$ group, a $PO(OM)_2$ group and a $NR_1R_2R_3X$ group, wherein M is an alkali metal or an ammonium group, each of $R_1$, $R_2$ and $R_3$ is a hydrocarbon group and X is an anionic group, in an amount of $1 \times 10^{-6}$ to $1 \times 10^{-2}$ equivalents per gram of said macromolecular compound; and said silane compound is present in an amount of 0.5 to 3.75 weight parts per 100 weight parts of the powder of the ferromagnetic material.

2. The magnetic recording medium according to claim 1, wherein said macromolecular compound further comprises $SO_3M$ or $SO_4M$.

3. The magnetic recording medium according to claim 1, wherein said macromolecular compound is a polyvinyl chloride resin comprising an epoxy group or a polyurethane resin comprising an epoxy group.

4. The magnetic recording medium according to claim 1, wherein said macromolecular compound comprises a polyvinyl chloride resin comprising epoxy group and a polyurethane resin comprising epoxy group.

5. The magnetic recording medium according to claim 1, wherein the binding material in the magnetic layer of the recording medium is present in an amount of 10 to 100 weight parts per 100 weight parts of the powder of the ferromagnetic material.

6. The magnetic recording medium according to claim 1, wherein the binding material in the magnetic layer of the recording medium is present in an amount of 14 to 40 weight parts per 100 weight parts of the powder of the ferromagnetic matter.

7. The magnetic recording medium according to claim 1, wherein said macromolecular compound is a polyurethane resin having an epoxy group or a polyester resin having an epoxy group and having a molecular weight of 1,000 to 200,000 or a copolymer of acrylonitrile and butadiene comprising an epoxy group with 12 to 50 weight percent acrylonitrile and having a molecular weight of 5,000 to 500,000 or a vinyl resin comprising an epoxy group selected from the group consisting of a copolymer resin of methyl methacrylate and glycidyl methacrylate, a copolymer resin of methyl methacrylate, acrylic acid and glycidyl methacrylate and a copolymer resin of styrene and glycidyl methacrylate.

8. The magnetic recording medium as claimed in claim 1, wherein each of $R_1$, $R_2$ and $R_3$ is an alkyl group, an allyl group, an alkenyl group or an alkoxy group.

9. The magnetic recording medium as claimed in claim 1, wherein said silane compound is selected from the group consisting of
N-(2-aminoethyl)-3-aminopropylmethyldimethoxysilane,
N-(2-aminoethyl)-3-aminopropyltrimethoxysilane,
p-(N-(2-aminoethyl)aminomethyl)phenetyltrimethoxysilane,
1-(3-aminopropyl)-1,1,3,3,3-pentamethyldisiloxane,
3-aminopropyltriethoxysilane,
3-aminopropyl-tris(trimethylsiloxy)silane,
3-(N-allyl-N-(2-aminoethyl)aminopropyltrimethoxysilane,
N-(3-(trimethoxysilyl)propyl)diethylenetriamine,
N-(3-(trimethoxysilyl)propyl)triethylenetetramine,
3-trimethoxysilylpropyl-m-phenylenediamine,
1,3-bis(3-aminopropyl)-1,1,3,3-tetramethyldisiloxane,
$\alpha,\omega$-bis(3-aminopropyl)polydimethylsiloxane,
N,N-bis((methyldimethoxysilyl)propyl)amine,
N,N-bis(3-(methyldimethoxysilyl)propyl)ethylenediamine,
N,N-bis(3-(trimethoxysilyl)propyl)amine,
N,N-bis(3-(trimethoxysilyl)propyl)ethylenediamine,
hexamethyldisilazane,
$\alpha,\omega$-bis(3-mercaptopropyl)polydimethylsiloxane,
1,3-bis(3-mercaptopropyl)-1,1,3,3-tetramethyldisiloxane,
1,3-bis(mercaptomethyl)-1,1,3,3-tetramethyldisiloxane,
$\alpha,\omega$-bis(mercaptomethyl)polydimethylsiloxane,
3-mercaptopropyl-tris(trimethylsiloxy)silane,
3-mercaptopropyltrimethoxysilane,
1-(3-mercaptopropyl)-1,1,3,3,3-pentamethyldisiloxane and
1-mercaptomethyl-1,1,3,3,3-pentamethyldisiloxane,
and the binding material in the magnetic layer of the recording medium is present in an amount of 10 to 100 weight parts per 100 weight parts of the powder of the ferromagnetic material.

10. The magnetic recording medium as claimed in claim 9, wherein the ferromagnetic material is a powder of a ferromagnetic oxide of iron selected from the group consisting of $\gamma$-$Fe_2O_3$, $Fe_3O_4$ and $\gamma FeO_x$ where $1.33 < X < 1.5$, a powder of said ferromagnetic oxide of iron doped with cobalt, a powder of a ferromagnetic chromium dioxide or a powder of iron carbide.

* * * * *